United States Patent [19]
Baker et al.

[11] 3,826,224
[45] July 30, 1974

[54] THERMOPLASTIC DISPENSER SYSTEM HAVING NON-CLOGGING MELTING ZONE

[75] Inventors: Robert G. Baker, Avon; Alan B. Reighard, Bay Village, both of Ohio

[73] Assignee: Nordson Corporation, Armherst, Ohio

[22] Filed: Nov. 2, 1971

[21] Appl. No.: 194,862

[52] U.S. Cl. ............... 118/2, 118/410, 222/146 HE, 222/334
[51] Int. Cl. ................................................ B05c 1/00
[58] Field of Search ......... 222/146 R, 146 HE, 386, 222/383, 333, 334, 504, 510; 219/227, 229; 425/DIG. 55; 18/30 N, 30 JT; 92/170; 118/2, 3, 202, 410, 1

[56] References Cited
UNITED STATES PATENTS

| | | | |
|---|---|---|---|
| 2,203,299 | 6/1940 | Hallwood | 222/510 X |
| 2,831,214 | 4/1958 | Eyles et al. | 222/334 X |
| 2,925,800 | 2/1960 | Wassem | 118/1 |
| 2,995,159 | 8/1961 | Berggren | 219/227 |
| 3,008,188 | 11/1961 | Hawey | 222/334 X |
| 3,377,012 | 4/1968 | Cushman | 222/146 HE |
| 3,530,772 | 9/1970 | Mori | 92/170 |
| 3,550,815 | 12/1970 | Salouen | 222/146 HE |
| 3,570,725 | 3/1971 | Baker et al. | 222/504 |

*Primary Examiner*—Robert B. Reeves
*Assistant Examiner*—David A. Scherbel
*Attorney, Agent, or Firm*—Wood, Herron & Evans

[57] ABSTRACT

This invention relates to a system for dispensing thermoplastic materials and particularly to a system for dispensing so-called "high performance" hot melt adhesives. More specifically, the invention relates to dispensing systems in which solid thermoplastic or hot melt material is melted in small charges or batches and is then supplied upon demand in liquid form to a dispensing gun, the quantity of molten material being maintained at a minimum from the area in which it is melted to the dispensing nozzle of the gun.

14 Claims, 3 Drawing Figures

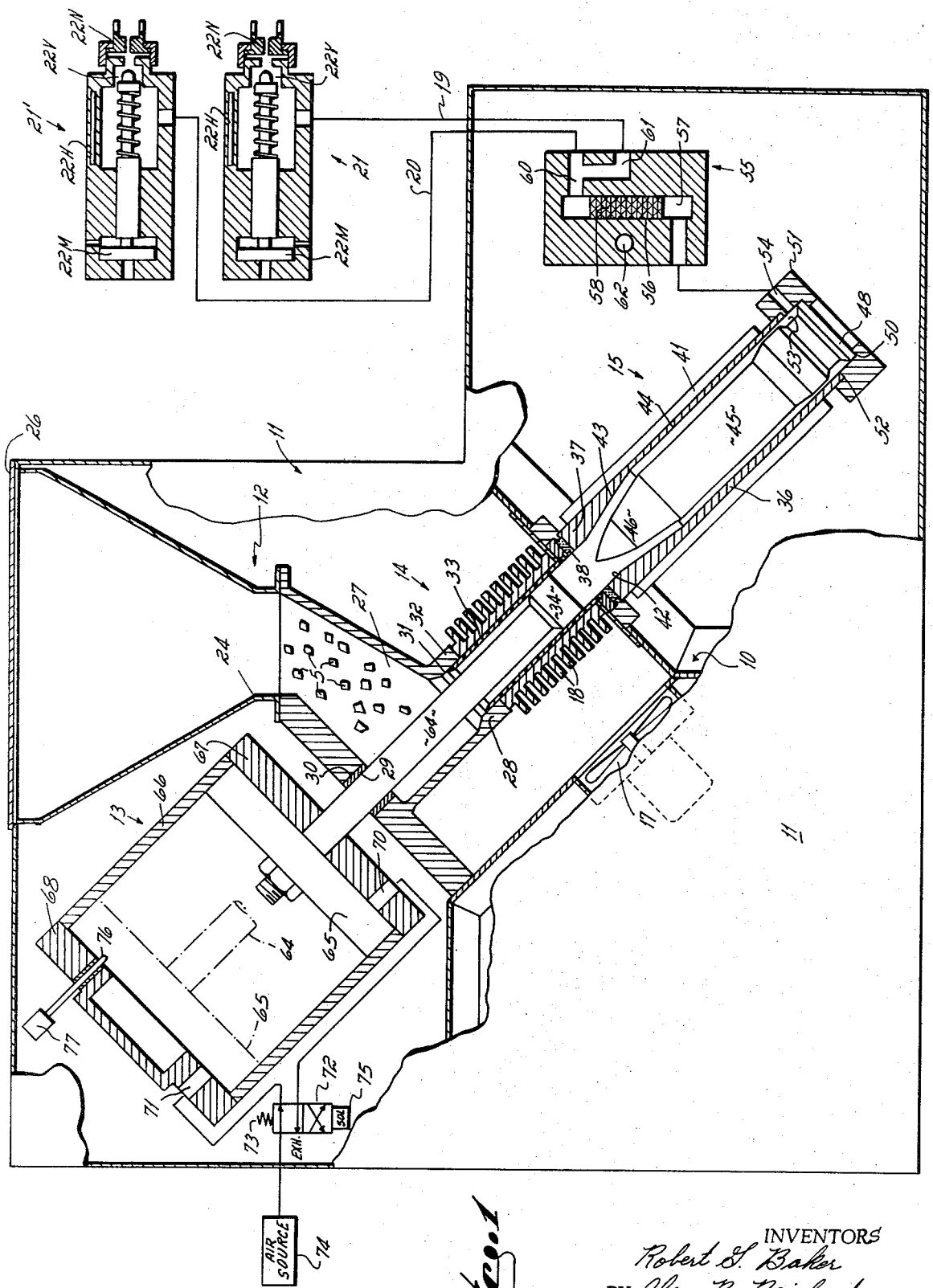

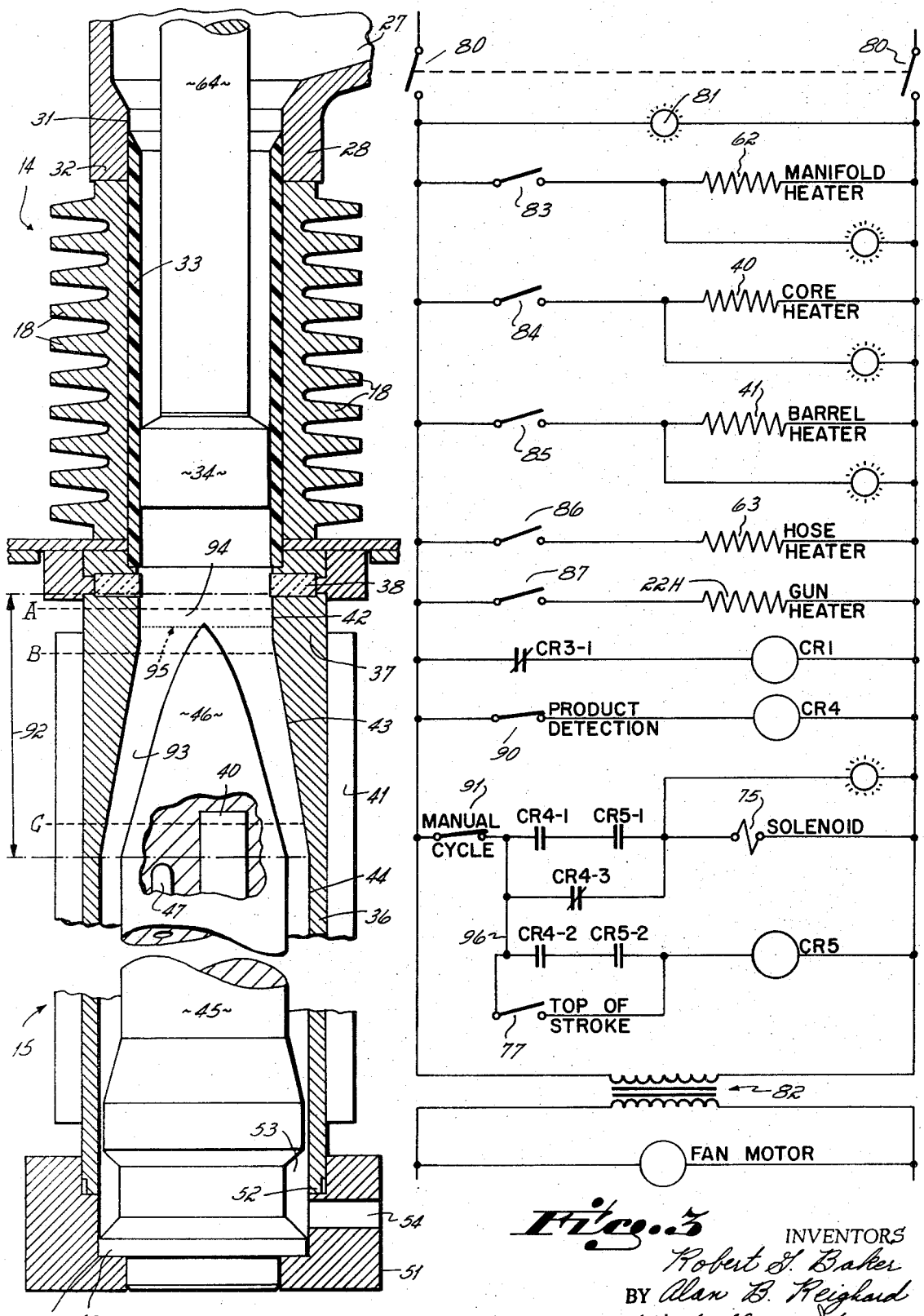

THERMOPLASTIC DISPENSER SYSTEM HAVING NON-CLOGGING MELTING ZONE

Thermoplastic adhesives or so-called "hot melt" adhesives, are now commonly used for bonding numerous diverse materials. Primarily, however, hot melts are used for sealing packages where the high speed setting time of the hot melt material may be used to advantage. More recently, though, there has been a great deal of interest in the use of hot melts for product assembly, as for example, in the assembly of automobiles, electronics, electrical equipment, appliances, electrical components, furniture, air craft subassemblies, and metal-to-metal bonds. In very few product assembly applications, though, can the same hot melt adhesives be used as have heretofore been commonly used for packaging. Usually, product assembly requires that the adhesive have a higher cohesive strength or better surface wetability or a wider in-use temperature range or resistance to a wider variety of chemicals or all of these things than has been required for packaging. In other words, the tolerances for product assembly hot melt are much more critical than for packaging.

For these reasons the adhesives which are presently under development or are already developed and under consideration for product assembly have many different characteristics than earlier packaging type hot melts. These new hot melt adhesives have been labeled "high performance" and are usually polyesters, hydroxyvinyl resins, polyamids, etc. They have many of the desirable properties needed for these high performance applications, Negatively, though, these high performance hot melt materials exhibit highly unstable characteristics at application temperatures, much higher melting and application temperatures than have heretofore been required for the application of so-called packaging type hot melts, and generally higher viscosity. These negative characteristics have for the most part limited if not precluded the use of these high performance materials in many applications, generally because of the lack of any equipment to apply the adhesive to a substrate.

Equipment which has heretofore been used to apply packaging type hot melts to substrates has upon occasion been used in an attempt to apply high performance hot melts to the same or different substrates. Generally, the result has been a failure or even a catastrophe, usually because either (1) the material degraded so much more quickly than the old fashioned hot melt materials when in the melted condition that when it finally reached the substrate it no longer had the adhesive characteristics for which it was designed, or (2) because the material set up or hardened in the melting and dispensing equipment prior to reaching the applicator gun discharge nozzle.

It has therefore been a primary objective of this invention to provide a new and improved apparatus for melting and dispensing so-called high performance thermoplastic or hot melt materials.

Still another objective of this invention has been to provide a dispensing system which is operable to dispense high performance hot melt material in the liquid state without any or with a very minimum of degradation of the product from the time it is melted to the time it is applied to the substrate.

Still another objective of this invention has been to provide a dispensing system operable to maintain the hot melt material in the solid state until it is ready for use and then to melt it and maintain only a very minimum volume of liquid material between the melting zone and the dispensing nozzle. In other words, it has been an objective of this invention to provide a hot melt dispensing system in which the solid material is only melted upon demand for its use in the liquid state with the result that only the very minimum volume of liquid material is maintained in its melted state in which it is subject to degradation from exposure to the heat required to melt it and maintain it in its molten state.

In order to maintain a minimum volume of molten material and to enable only that amount of material which is required at the gun to be melted, the invention of this application comprises a reciprocating plunger type charging and melting system operable upon the back stroke of a plunger or piston to accept a charge of solid material in front of the piston and upon the forward stroke to feed the charge through a melting zone and into the dispensing gun. In this way only as material is dispensed through the gun is a corresponding amount melted back upstream from the gun. If little or no molten material is dispensed from the gun, little or no material is melted in the system. Alternatively, though, if a large quantity of material is dispensed through the gun, the similar large quantity of material is melted to accommodate the gun.

There have been prior attempts at the utilization of a reciprocating piston to feed charges of solid hot melt adhesives into and through a heating zone of a dispensing system. Those prior attempts, though, have been subject to the shortcoming that it has not been possible with those systems to maintain an even uniform valved flow of the molten material from the dispensing gun.

It has therefore been a primary objective of this invention to provide a reciprocating piston type of dispensing system for forcing a charge of solid thermoplastic material into and through a melting zone of the system in which the molten material ejected from the gun of the system is ejected evenly and uniformly upon opening of a valve of the gun. Expressed another way, it has been an objective of this invention to provide a reciprocating piston type of thermoplastic dispenser system in which the pressure of the material supplied to the gun is maintained at an even uniform pressure internally of the gun. Consequently, the gun may dispense precise amounts of the material evenly and uniformly from the orifice upon opening of a valve internally of the gun.

In order to melt the solid thermoplastic material at a rapid rate commensurate with the rate of use at the gun, the dispenser system of this invention incorporates a heated core located internally of a barrel in the melting zone of the system. This core, as well as the surrounding barrel, are heated so as to obtain a temperature in the melting zone of the system above the melting temperature of the thermoplastic material. Pressure on the molten material is applied to it through a semi-molten zone of material located between the molten and the solid material. The total pressure on the molten material is thus a function of both the force on the piston and the effective area of the semimolten material. If the area of the semimolten material acting against the molten material varies or if the force at the piston varies, there is a corresponding pressure change in the molten material. We have found, through, that this molten material pressure variance may be avoided or for practical purposes eliminated if the effective area of the barrel throughout the melting zone is maintained fixed and if the friction between the solid material and the charging cylinder is minimized. To this end, the invention of this application incorporates a taper onto the upstream end of the core and a corresponding taper on the interior of the barrel throughout the melting zone. This has the effect of minimizing effective area changes in the semimolten material which is acting against the molten material to pressurize it. To minimize friction between the solid thermoplastic material and the cylinder and resulting force differences at the piston, the invention of this application incorporates a Teflon sleeve internally of the cylinder within which the charging piston is reciprocable and the solid material is movable to the melting zone. The Teflon sleeve has been found to minimize frictional force variances in the cylinder particularly when the solid thermoplastic material is in the form of pellets which tend to compact and bind up in the cylinder.

Still another objective of this invention has been to provide an improved control for a reciprocating type hot melt dispensing system. Heretofore, reciprocating piston type hot melt dispenser systems have been primarily used in applications in which the piston recycles or returns to a withdrawn position and picks up a new charge of solid hot melt material very infrequently. Consequently, this type of system has required a relatively large charge of material and a relatively large volume of melted molten material. The improved control of this invention enables the system to be cycled more frequently with a minimum of inconvenience in the operation of the system so that smaller quantities of material may be maintained in the molten state. This improved control is operable to recycle the ram upon removal of an article to which the molten material is being applied from adjacent the nozzle. By recharging the system in the absence of an article adjacent the nozzle of the dispenser, a minimum of dispensing time is lost in the recharging portion of the cycle.

The dispensing system of this invention also includes a cooled cylinder within which the reciprocating piston is cycled. In the preferred embodiment an air stream is directed over fins on the exterior of the cylinder to cool the cylinder and preclude molten material from backing up into the cylinder. If allowed to back into the cylinder it would contact the piston and "adhere" it to the cylinder.

The primary advantage of the dispensing system of this invention is that it enables thermoplastic materials to be dispensed from a high speed dispensing gun in a uniform even flow through the gun nozzle. It also has the advantage of maintaining a very minimal pool of molten material so that there is very little deterioration of the material caused by prolonged exposure of heat.

These and other objects and advantages of this invention will be more readily apparent from the following description of the drawings in which:

FIG. 1 is a partially diagrammatic cross sectional view of a dispensing system incorporating the invention of this application;

FIG. 2 is an enlarged cross sectional view through the charging piston and the melting zone of the system; and FIG. 3 is a diagrammatic illustration of the control system which controls cycling of the dispensing system.

The dispensing system of this invention is illustrated and described herein as being utilized to melt pillets 5 of thermoplastic material. While the system is so illustrated, it is equally applicable to systems which utilize bulk, chunk or granular solid "hot melt" or thermoplatic material.

A preferred embodiment of the dispenser system of this invention is depicted in FIG. 1. It comprises a frame 10 mounted within a housing 11. Supported upon the frame there is a hopper 12, a pneumatic motor 13, a supply cylinder 14, and a melting and transfer barrel 15. Additionally, there is a motor-driven fan 17 for moving cooling air over fins 18 of the cylinder 14. A pair of hoses 19 and 20 connect the discharge end of the barrel to dispenser guns 21 and 21'.

The dispenser guns 21, 21' have only been illustrated diagrammatically because they form no part of the invention of this application. Basically the guns comprise a nozzle 22N through which molten material is ejected whenever a valve 22V is opened, either manually or by motor 22M mounted on the gun. In order to maintain the thermoplastic material in a molten state in the gun, it generally includes a thermostat controlled heater 22H (FIG. 3). One gun suitable for this use is completely described in U.S. Pat. No. 3,570,725 of Robert C. Baker et al., which patent is assigned to the assignee of this application. For purposes of completing the disclosure of this application, the disclosure of that patent is hereby incorporated by reference.

The hopper 12 comprises a sheet metal funnel 24, the upper end of which is closed by a cover 26 of the housing. The bottom of the funnel opens into a feed chute 27, the innermost end 28 of which is closed and forms a continuation of the rear portion of the cylinder 14. To that end, there is a bushing 29 mounted in a cylindrical opening 30 in the rear wall of chute 27. Coaxial with the bushing opening 30 there is an opening 31 at the forward end of the chute 27 through which pellets 5 of material may be charged into the cylinder 14 as explained more fully hereinafter.

The forward facing opening 31 in the chute 27 extends into and through a boss 32. The cylinder 14 is sealingly connected to this boss. Cooling fins 18 extend radially outwardly from the surface of this cylinder so that an air stream from the fan 17 is effective to cool the cylinder 14.

A Teflon sleeve 33 extends forwardly from the boss 32 through the interior of the cylinder 14. A piston 34 is loosely slideable within the Teflon sleeve 33. Preferably there is sufficient clearance between the peripheral surface of the piston and the inside surface of the Teflon liner to permit gases formed during melting of the thermoplastic material to pass rearwardly between the piston and the liner 33.

The barrel 15 is coaxially aligned with and forms an extension of the cylinder 14. It comprises a tubular body 36 having a rear section 37 of the same inside diameter as the inside diameter of the Teflon liner 33. A heat insulating ring 38 preferably separates the rear section 37 of the barrel body 36 from the cylinder 14 and insures that heat generated by barrel heaters 40 and 41 is not transmitted into the cylinder. From the upper or rear end section 37, the inside surface 42 of the barrel body 36 diverges outwardly through a tapered section 43 to an enlarged diameter cylindrical surface 44. This large diameter cylindrical surface section 44 then extends from the tapered section 43 forwardly to the end of the cylinder.

Mounted interiorly of the barrel 15, there is a generally cylindrical metal core 45. At the upper or rear end the core is tapered or conical, as indicated at 46, and generally parallels the tapered section 43 of the barrel. The core is held in spaced coaxial relation to the inner surface of the barrel by spiders (not shown) which extend between the core and the interior surface of the barrel. One of the barrel heaters 40 is contained within the core 45. In the preferred embodiment this heater 40 is an electrical resistance heater, the temperature of which is controlled by a bulb type thermostat 47 also mounted interiorly of the core.

At the bottom of the core there is a radial flange 48 engageable with a shoulder 50 of a nut 51. The rearwardmost end 52 of this nut is threaded over or otherwise fixedly secured to the forward end of the barrel 15 so that the barrel and core are held in an assembled relation by the nut.

Around the lower or forward end of the core, there is an annular channel 53 which is intersected by a radial opening 54 through the nut 51. The opening 54 connects the annular channel 53 to the interior of a manifold block 55. This block has a filter containing bore 56 communicating with radial opening 54 of the barrel through a passage 57. A filter 58 is enclosed within the bore 56. On the opposite side of the filter from the passage 57, a pair of passages 60 and 61 in the manifold block connect the filter passage 61 with the hoses 19 and 20. The hoses in turn connect the manifold block to the dispensing guns 21, 21'. Thermostat controlled heaters 62, 63 and 22H (FIG. 3) maintain the manifold block, the hoses, and the guns all at a temperature near the melting temperature of the material pellets 5 so as to maintain the melted thermoplastic material in a molten condition during transfer from the barrel 15 to and through the dispensing guns 21, 21'.

In order to effect reciprocation of the piston 34, a piston rod 64 extends between the piston 34 and a piston 65 of the pneumatic motor 13. The piston 65 of the motor is reciprocable within a cylinder 66, the opposite ends 67, 68 of which are ported as indicated at 70, 71. The ports 70, 71 are connected to a solenoid-operated four-way valve 72. This valve 72 is normally biased by a spring 73 to a position in which the lower port 70 is connected to a source of air pressure 74. When the solenoid 75 of the valve 72 is energized, it causes the spool of the valve to move to a position to connect the opposite or upper port 71 to the source of air pressure, simultaneously connecting the other port 70 to exhaust. As a result of this valve connection, the piston 65 is normally maintained in an upper or raised position so that it is failsafe to the extent that with no electrical power on or if the power should fail, the piston 34 returns to its raised position thereby precluding accidents resulting from fingers or tools being in the path of travel of the ram upon failure.

A reciprocable plunger 76 extends through the upper end cap 68 of the motor 13. This plunger controls actuation of an electric switch 77 which functions to detect the position of the piston to control cycling of the piston 34, as is explained more fully hereinafter.

In operation, the hopper 12 is filled or charged with pellets 5 of solid thermoplastic material. While in the preferred embodiment pellets of thermoplastic material are utilized to charge the hopper, the thermoplastic material could be in the form of granules or even of solid bars which sequentially move through a magazine. Irrespective of the form in which the solid material is supplied to the hopper, it moves through the hopper into the zone immediately in front of the piston 34. At this point with the electrical controls not yet turned on, the air pressure source 74 is connected to the port 70 of the pneumatic motor 13 and the port 71 is connected through the valve 72 to exhaust or atmosphere so that the piston is in its upper or raised position as depicted in phantom in FIG. 1.

After the hopper has been filled with material, the machine is turned on by actuating the control circuit depicted in FIG. 3. Turning on the machine results in closing of a circuit breaker 80 and completion of an electrical control circuit to a light 81 (indicating that the machine is turned on) and a fan motor control transformer 82. The fan 17 is therefore energized and commences movement of cooling air over the fins 18 of the cylinder.

Closing of the circuit breaker 80 also completes circuits to the manifold heater 62, the core heater 40, the barrel heater 41, the hose heater 63, and the gun heater 22H through the respective thermostat switches 83, 84, 85, 86 and 87 associated with each of the heaters. These thermostats are preset to a temperature of approximately the melting temperature of the thermoplastic material to be dispensed through the system. The barrel and core heaters may be set to a temperature slightly in excess of the melting temperature, and the hose gun and manifold heaters may be set to a temperature slightly less than the melting temperature but above the freezing temperature at which the thermoplastic material reconverts to a solid. In the preferred embodiments there are indicator lights connected in parallel with the manifold, core and barrel heaters to indicate that those heaters are still being heated. Normally, the machine cycle would not be started until these lights go out, indicating that the thermostats associated with each of these heaters have opened and that the heaters are at temperature.

When the power to the circuit is turned on by closing of the circuit breaker or switch 80, a piston control cycle is initiated through a control circuit to the solenoid 75 of valve 72. This circuit initially energizes the solenoid to initiate downward movement of piston 65 through a normally closed manual cycle switch 91 and a normally closed contact CR4-3 of relay CR4. Simultaneously, the relay CR4 is energized through a normally closed product detection switch 90. Another control relay CR5 is also immediately energized through the manual cycle control switch 91, a lead 96 and the switch 77 which is closed so long as the pneumatic motor piston 65 is in its fully raised position. As soon as the relay CR5 is energized, a holding circuit is pulled in to the solenoid 75 through normally open contacts CR4-1 and CR5-1. A holding circuit to the relay CR5 also pulls in through the manual cycle switch 91, lead 96, and the normally open contacts CR4-2 and CR5-2. The piston 65 starts down and continues to move downwardly until the molten material in the barrel is fully pressurized. The system is now ready for application of molten material to a product or article by application through the guns 21, 21'.

When a product or article is located adjacent the nozzles of the guns 21, 21', the article contacts and opens the normally closed product detection switch 90. This has the effect of dropping out the relay CR4 as well as the holding circuits to the solenoid 75 and relay CR5 through opening of the contacts CR4-1 and CR4-2 of relay CR4. The solenoid 75 remains energized though, through normally closed contact CR4-3 so that the molten material remains pressurized after insertion of a product beneath the nozzles of the guns 21, 21'.

After this molten material has been dispensed through the guns onto the article, the article is removed, thereby closing the normally closed product detection switch 90 and energizing the relay CR4. This has the effect of opening all circuits paths to the solenoid 75 so that the solenoid is thereby deenergized. When the solenoid is de-energized the lower side of the piston 65 is connected to the source of air pressure and the top side is connected to exhaust. The piston therefore moves upwardly until the piston 65 reaches the upper end of its stroke and contacts the plunger 76 of switch 77. When the switch 77 closes, a circuit is completed to the relay CR5 through the manual cycle switch 91, lead 96 and the switch 77. Closing of this relay again completes a circuit to the solenoid 75 through the contacts CR4-1 and CR5-1 so that the piston 65 again moves downwardly to pressurize the molten material preparatory to insertion of the next article beneath the gun nozzles.

As the pneumatic piston 65 moves forward or downwardly, it carries with it the charging piston 34. In moving forward the charging piston pushes the solid pellets of thermoplastic material ahead of it and down into and through the cylinder 14. As the solid pellets move into the melting zone, indicated in FIG. 1 by the numeral 92, the pellets are caused to melt and convert from a solid to a liquid molten material 93. Between the liquid material 93 and the solid pellets 5 within the melting zone 92, there is a zone 94 of semimolten material, the effective area of which controls the pressure on the molten material 93. As the plunger 34 moves forwardly, the zone of semimolten material 94 moves forwardly and downwardly with it. One aspect of this invention is predicated upon the determination that the pressure of the liquid material 93 changes as the effective area of the semimolten material 94 changes. In the course of moving over the tapered end 46 of the core 50, the effective area of the interface 95 between the molten 93 and semimolten material 94 changes but for the taper 43 of the barrel body 36. However, because the inner surface 41 of the barrel body is tapered adjacent the nose 46 and generally parallels the taper of the nose, the effective area through which the interface 95 is movable from the plane A (representing the cross sectional area of the barrel above the nose 46) to the plane B (adjacent the tip of the nose) to a plane C (near the forwardmost end of the tapered nose) does not change. In other words, the area of the barrel in the plane A is approximately the same as the area between the surface of the core and the inside surface of the barrel in the plane B and is approximately the same as the area between the surface of the core and the inside surface of the barrel in the plane C. Consequently, the effective area of the semimolten interface 95 with the molten material which acts to pressurize the molten area remains fixed as the interface moves through these planes. Since the pressure of the molten material is a function of the area of the interface, stabilizing or holding that area at a fixed value has the effect of stabilizing the pressure of the molten material at the guns 21, 21'.

We have found that by inserting a Teflon liner 33 in the cylinder 14, the pressure of the molten material in the barrel and at the guns 21, 21' may be maintained at a relatively fixed value throughout a long stroke of the piston 34 in the cylinder 14. However, if the Teflon liner is omitted and a steel cylinder employed without a liner, there may be as much as a 25% variance in the pressure of the molten material at the gun in the course of a single stroke of the piston 34. This pressure variance is explained by the loss of pressure on the output end of a cylinder of pelletized material 5 caused by friction between the cylinder 33 and the pelletized material 5. There is a great deal of frictional loss of pressure to the wall of the cylinder 33 if the cylinder of material 5 is long and of small diameter. As the cylinder of material melts, though, there is less frictional loss between the cylinder of material 5 and the confining cylinder 14. The pressure loss to friction then decreases and the pressure on the output of the cylinder of material 5 (and at the gun 21) increases. The result is a pressure variance at the gun throughout the stroke of the piston 34.

By selecting a material with a low coefficient of friction for the liner 33 of the cylinder 14, frictional losses and design limitations imposed by those losses are minimized. Consequently the low friction liner 33 enables a longer, smaller diameter, cylinder to be employed in the system than would be possible with a hign friction material liner 33 while maintaining relatively fixed or constant pressure in the molten material at the gun. In fact, we have found that a Teflon liner substituted for steel in a system enables the length to diameter ratio of the stroke of the piston 34 to be increased from approximately 1 to 1 to a ratio of 2½ to 1 while maintaining a relatively fixed pressure (generally no more than 10 percent variance) in the molten material at the guns 21, 21' throughout the stroke of the piston 34.

While we have described only a single preferred embodiment of our invention, persons skilled in the art to which this invention pertains will readily appreciate numerous changes and modifications which may be made without departing from the spirit of our invention. Therefore, we do not intend to be limited except by the scope of the following appended claims.

Having described our invention, we claim:

1. A system for dispensing molten thermoplastic material comprising a frame including a hopper, a cylinder, and a barrel, said barrel projecting from the forward end of said frame and including a melting zone, a molten material transfer zone, and an outlet port, said outlet port being located adjacent the front of said barrel, a heating chamber located in said barrel, said chamber including a metallic core mounted in said chamber in radially spaced relation to the inside wall of said barrel, said chamber including at least one heater operable to heat the inner surface of said barrel and the outer surface of said core to at least the melting temperature of said thermoplastic material, said cylinder being in fluid communication with said barrel and sealingly connected to the rearward end thereof, a piston mounted to reciprocate in the bore of said cylinder, a motor mounted on said frame rearwardly of said cylinder and operable to effect reciprocation of said piston, said hopper being mounted on said frame and operable when said piston moves rearwardly in said barrel to deliver a charge of solid material into said cylinder between said piston and said heating chamber such that the material is forced by said piston forwardly successively into and through said cylinder and said barrel upon forward movement of said piston, a dispenser gun including an inlet port, a flow control valve, and an outlet orifice, fluid conduit means connecting the inlet port of said gun to the outlet port of said barrel, and said barrel having a constant flow area throughout the melting zone so as to enable a relatively uniform even rate of flow of molten material to be maintained from the outlet orifice of said gun when said valve is open.

2. The dispensing system of claim 1 in which said metallic core includes a tapered end located adjacent the rearward end of said barrel in said melting zone, said barrel having a tapered inside surface located adjacent said tapered end of said core so as to maintain a constant flow area between said core and said inside surface of said barrel adjacent said core.

3. The dispensing system of claim 1 which further includes fluid flow means for cooling said cylinder so as to preclude molten thermoplastic material from flowing rearwardly into said cylinder and into contact with the surface of said piston.

4. The dispensing system of claim 3 in which said fluid flow means includes fins on the exterior of said cylinder and a motor driven fan for moving air over the surface of said fins to cool said cylinder.

5. The dispensing system of claim 1 which further includes a low friction material liner sleeve contained within said cylinder.

6. The dispensing system of claim 1 which further includes means for controlling reciprocation of said piston, said control means being operable to effect rearward and then forward recharging movement of said piston in response to removal from adjacent said dispenser gun outlet orifice of an article to which material has been applied.

7. The dispensing system of claim 6 in which said piston reciprocation motor comprises a pneumatic motor and in which said control means includes a solenoid operated valve and an electrical circuit including a product detection switch operable to detect removal of an article from adjacent the outlet orifice of said dispenser gun.

8. A system for dispensing molten thermoplastic material comprising a frame including a cylinder and a barrel, said barrel projecting from the forward end of said frame and including a melting zone and a molten material transfer zone, a heating chamber located in said barrel, said chamber including a metallic core mounted in said chamber in radially spaced relation to the inside wall of said barrel, said chamber including at least one heater operable to heat the inner surface of said barrel and the outer surface of said core to at least the melting temperature of said thermoplastic material, said cylinder being in fluid communication with said barrel and sealingly connected to the rearward end thereof, a piston mounted to reciprocate in the bore of said cylinder, a motor mounted on said frame rearwardly of said cylinder and operable to effect reciprocation of said piston, a dispenser communicating with said barrel transfer zone and including a flow control valve and an outlet orifice, and said barrel having a constant flow area throughout the melting zone so as to enable a relatively uniform even rate of flow of molten material to be maintained from the outlet orifice of said dispenser when said valve is open.

9. The dispensing system of claim 8 in which said metallic core includes a tapered end located adjacent the rearward end of said barrel in said melting zone, said barrel having a tapered inside surface located adjacent said tapered end of said core so as to maintain a constant flow area between said core and said inside surface of said barrel adjacent said core.

10. The dispensing system of claim 8 which further includes fluid flow means for cooling said cylinder so as to preclude molten thermoplastic material from flowing rearwardly into said cylinder and into contact with the surface of said piston.

11. The dispensing system of claim 10 in which said fluid flow means includes fins on the exterior of said cylinder and a motor driven fan for moving air over the surface of said fins to cool said cylinder.

12. The dispensing system of claim 8 which further includes a low friction material liner sleeve contained within saud cylinder.

13. The dispensing system of claim 8 which further includes means for controlling reciprocation of said piston, said control means being operable to effect rearward and then forward recharging movement of said piston in response to removal from adjacent said dispenser gun outlet orifice of an article to which material has been applied.

14. The dispensing system of claim 13 in which said piston reciprocation motor comprises a pneumatic motor and in which said control means includes a solenoid operated valve and an electrical circuit including a product detection switch operable to detect removal of an article from adjacent the outlet orifice of said dispenser gun.

* * * * *